US010056598B2

(12) United States Patent
Mack et al.

(10) Patent No.: US 10,056,598 B2
(45) Date of Patent: Aug. 21, 2018

(54) RECESSED TERMINAL IN MODULE BODY (71) Applicant: Johnson Controls Technology Company, Holland, MI (US)

(72) Inventors: Robert J. Mack, Milwaukee, WI (US); Richard M. DeKeuster, Racine, WI (US); Ken Nakayama, Franklin, WI (US); Jonathan P. Lobert, Hartford, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 223 days.

(21) Appl. No.: 14/802,846

(22) Filed: Jul. 17, 2015

(65) Prior Publication Data

US 2016/0064722 A1 Mar. 3, 2016

Related U.S. Application Data (60) Provisional application No. 62/041,988, filed on Aug. 26, 2014.

(51) Int. Cl.
*H01M 2/30* (2006.01)
*H01M 2/10* (2006.01)
(Continued)

(52) U.S. Cl.
CPC ......... *H01M 2/305* (2013.01); *B60L 11/1851* (2013.01); *B60L 11/1877* (2013.01); *B60L 11/1879* (2013.01); *H01M 2/1072* (2013.01); *H01M 2/1077* (2013.01); *H01M 2/206* (2013.01); *H01M 2/26* (2013.01); *H01M 2/307* (2013.01); *H01M 10/0525* (2013.01); *H01M 2200/20* (2013.01); *H01M 2220/10* (2013.01); *H01M 2220/20* (2013.01); *Y02T 10/705* (2013.01); *Y02T 10/7011* (2013.01); *Y02T 10/7016* (2013.01)

(58) Field of Classification Search
CPC ............... H01M 2/1077; H01M 2/206; H01M 2/30–2/307
See application file for complete search history.

(56) References Cited

U.S. PATENT DOCUMENTS 4,245,014 A * 1/1981 Veit, Jr. ................... H01M 2/08
429/181
5,202,198 A 4/1993 Mix et al.
(Continued)

FOREIGN PATENT DOCUMENTS

CN 102891278 1/2013

OTHER PUBLICATIONS

PCT/US2015/046101 International Search Report and Written Opinion dated Dec. 8, 2015.

*Primary Examiner* — Matthew J Merkling
(74) *Attorney, Agent, or Firm* — Fletcher Yoder, P.C.

(57) ABSTRACT

The present disclosure includes a group of electrically interconnected battery cells disposed within a housing. The disclosure also includes a major terminal of a battery module configured to be coupled to a load for powering the load. One or more portions of the major terminal are disposed within a recess in a surface of the housing. The present disclosure also includes a bus bar that provides an electrical pathway between the group of electrically interconnected battery cells and the major terminal. The bus bar is disposed within the housing.

20 Claims, 7 Drawing Sheets (51) Int. Cl.
   *H01M 2/20*      (2006.01)
   *H01M 2/26*      (2006.01)
   *H01M 10/05*     (2010.01)
   *B60L 11/18*     (2006.01)
   *H01M 10/0525*   (2010.01)

(56) References Cited

U.S. PATENT DOCUMENTS

| | | | | |
|---|---|---|---|---|
| 5,283,137 | A * | 2/1994 | Ching | H01M 2/043 16/444 |
| 5,380,603 | A * | 1/1995 | Hooke | H01M 2/06 429/180 |
| 5,804,770 | A * | 9/1998 | Tanaka | H01M 2/206 174/138 F |
| 5,814,421 | A | 9/1998 | Spiegelberg et al. | |
| 6,025,088 | A | 2/2000 | Kump | |
| 6,632,562 | B1 | 10/2003 | Nakatsuka et al. | |
| 2003/0017392 | A1 | 1/2003 | Key et al. | |
| 2004/0180258 | A1 * | 9/2004 | Kau | H01M 2/20 429/121 |
| 2007/0024236 | A1 * | 2/2007 | Arakelian | H01M 2/1072 320/107 |
| 2009/0042098 | A1 * | 2/2009 | Nakayama | H01M 2/043 429/179 |
| 2009/0087734 | A1 * | 4/2009 | Akatsuchi | H01M 2/0404 429/178 |
| 2009/0297943 | A1 | 12/2009 | Bielawski et al. | |
| 2010/0143786 | A1 * | 6/2010 | Kim | H01M 2/0245 429/158 |
| 2011/0177384 | A1 | 7/2011 | Thuerk et al. | |
| 2012/0125447 | A1 * | 5/2012 | Fuhr | H01M 2/0262 137/260 |
| 2012/0129041 | A1 * | 5/2012 | Komazawa | H01M 2/1077 429/158 |
| 2012/0231305 | A1 | 9/2012 | Guen | |
| 2012/0263988 | A1 * | 10/2012 | Obasih | H01M 10/625 429/98 |

* cited by examiner

RECESSED TERMINAL IN MODULE BODY

CROSS REFERENCE TO RELATED APPLICATIONS

This application claims priority from and the benefit of U.S. Provisional Application Ser. No. 62/041,988, entitled "SEALABLE STAMPED ELECTRICAL CONNECTION BATTERY TERMINAL TO APPLICATION", filed Aug. 26, 2014, which is hereby incorporated by reference.

BACKGROUND

The present disclosure relates generally to the field of batteries and battery modules. More specifically, the present disclosure relates to a bus bar connection assembly for Lithium-ion (Li-ion) battery modules.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include a number of interconnected electrochemical cells coupled together via bus bars (e.g., minor bus bars) extending between terminals (e.g., minor terminals or cell terminals) of the electrochemical cells. Further, the battery module may include two major terminals electrically coupled with the interconnected electrochemical cells via corresponding electrical paths, each electrical path having a major bus bar extending from the major terminal between the major terminal and the minor terminal of one of the electrochemical cells. This enables the two major terminals to be coupled to a load for powering the load via electric power provided by the interconnected electrochemical cells. In traditional configurations, each major bus bar and corresponding major terminal of the battery module may be welded together to establish at least a portion of the electrical path between the major terminal and the minor terminal, which may require that the major bus bar and the major terminal are made of the same material, or at least compatible materials for welding. The welding steps and use of specific materials may result in a high cost of the battery module. Further, in traditional configurations, each major bus bar and corresponding major terminal of the battery module may be bulky connections that extend from the housing and/or may be exposed connections that may complicate manufacturing of the battery module. Such bulky and/or exposed connections expose the battery module to potential short circuits. Accordingly, it is now recognized that an improved major bus bar and major terminal (and assembly thereof) for battery modules is needed.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below. The present disclosure relates to batteries and battery modules. More specifically, the present disclosure relates to lithium ion battery cells that may be used in vehicular contexts (e.g., xEVs) as well as other energy storage/expending applications (e.g., energy storage for an electrical grid).

The present disclosure relates to a battery module. The battery module includes a group of electrically interconnected battery cells and a housing. The group of electrically interconnected battery cells are disposed within the housing. The battery module includes a major terminal that is configured to be coupled to a load for powering the load. One or more portions of the major terminal are disposed within a recess in a surface of the housing. The battery module includes a bus bar that provides an electrical pathway between the group of electrically interconnected battery cells and the major terminal. The bus bar is disposed within the housing.

The present disclosure also relates to a battery module having a housing. The housing comprising a recess disposed in a surface of the housing. The battery module includes an electrochemical cell having a minor terminal disposed within the housing. The battery module includes major terminal electrically coupled to the electrochemical cell. The major terminal includes a base and a post engaged within the base, where the base of the major terminal is disposed within the recess. The battery module also includes a bus bar that provides an electrical path between the minor terminal of the electrochemical cell and the major terminal of the battery module.

The present disclosure also relates to a method of manufacturing a battery module. The method includes disposing a base of a major terminal within a recess in a surface of a housing. A group of electrically interconnected battery cells are disposed within the housing. The method also includes inserting a post of a major terminal through an opening of the recess such that the base of the major terminal engages with the post of the major terminal. The method also includes coupling the major terminal to the group of electrically interconnected battery cells via a major bus bar disposed within the housing to provide an electrical pathway that powers a load.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., Lithium-ion (Li-ion) electrochemical cells) arranged to provide particular voltages and/or currents useful to power, for example, one or more components of an xEV. As another example, battery modules in accordance with present embodiments may be incorporated with or provide power to stationary power systems (e.g., non-automotive systems).

During assembly of a battery module, the individual electrochemical cells may be positioned in a housing of the battery module, and terminals (e.g., minor terminals or cell terminals) of the electrochemical cells may extend generally away from the housing. To couple the electrochemical cells together (e.g., in series or parallel), an electrical path between minor terminals of two or more electrochemical cells may be established by coupling pairs of minor terminals via corresponding bus bars (e.g., minor bus bars). Further, two of the electrochemical cells (e.g., on either end of the battery module or on ends of one or more stacks of electrochemical cells) may be electrically coupled to major terminals (e.g., module terminals or primary terminals) of the battery module via corresponding major bus bars, or via corresponding major bus bar assemblies, where the major terminals are configured to be coupled to a load for powering the load.

In traditional configurations, to ensure that the major terminals and their associated major bus bars do not become decoupled, the major terminals and major bus bars may be welded together. However, welding of the major terminal and the major bus bar may require that the material of the major bus bar is the same as the material of the major terminal, or at least compatible for welding. Further, the material of the major bus bars may depend on the material of the corresponding minor terminals (e.g., of the electrochemical cells) from which the major bus bars extend, or on the material of one or more intervening components (e.g., a shunt coupled to a printed circuit board (PCB 63)). This may increase a material cost of the battery module and complexity of manufacturing. Further, associated geometries, assemblies, and welding techniques for traditional configurations such as those described above may contribute to a volume of the battery module, thereby reducing an energy density of the battery module. Furthermore, in traditional configurations, major terminals and their associated major bus bars may generally extend away from the housing in bulky and/or exposed connections. Indeed, such extended connections may complicate manufacturing of the battery module. For example, extended connections may expose joints or other connections, thereby exposing the battery module to potential short circuits and/or other complications.

To address these and other shortcomings of traditional battery module configurations, battery modules in accordance with the present disclosure include major terminals disposed within a recess (e.g., an opening, a pocket, etc.) that is formed within a housing of the battery module. In some situations, the major terminal may be referred to as a stamped major terminal, a stamped terminal, a recess terminal, a major recess terminal, a female terminal, and so forth. In particular, in such embodiments, the major terminal may include a base and a post that is configured to engage with the base. The base may be a single continuous unit molded into the recess of the housing. The post may be inserted within the base disposed within the recess to form a continuous unit, thereby allowing for electrical flow through the continuous component to the major bus bar without external joints or connections. In particular, the post associated with the major terminal (e.g., threaded nut) may be inserted and removed through an opening of the recess, such that the post (e.g., threads of the nut) engages the base of the major terminal molded into the recess.

It should be noted that in certain embodiments, the material of the base of the major terminal (e.g., copper) may be different than the material of the post of the major terminal (e.g., stainless steel). Accordingly, the base and post of the major terminal may electrically couple without welding or otherwise integrally coupling, despite being formed of different materials. In this manner, in certain embodiments, the post of the major terminal may be inserted and/or removed from the base (e.g., swapped out) with more flexibility. In certain embodiments, a housing cover may be used to seal the stamped terminal within the recess of the housing while providing an opening for the post to be inserted and removed. In this manner, the battery module may be electrically coupled to the load without any joints exposed or extending from the housing of the battery module. Specifically, the major terminal of the battery module may be fully integrated into the housing of the battery module.

In certain embodiments, the base of the major terminal may be securely retained within the recess disposed within the housing of the battery module, rather than be molded into the recess. For example, in such embodiments, the major bus bar may be disposed on a surface of the housing above the recess, and may engage a top surface of the base of the major terminal (e.g., threaded nut) disposed within the recess of the housing. The base of the major terminal may be configured to receive the post of the major terminal within the recess of the housing, thereby electrically coupling the load to the battery module without any exposed joints or connections. In such embodiments, the base of the major terminal may be disposed within the recess such that it is sandwiched between the major bus bar and a lower portion of the housing structure. As noted above, in certain embodiments, the conductive material of the base of the major terminal (e.g., copper) may be different than the conductive material of the post of the major terminal (e.g., stainless steel), thereby allowing the major terminal to electrically engage without welding and lowering the material cost of the battery module. In addition, by utilizing the recess disposed within the housing of the battery module to retain the major terminal, the load may be coupled to the battery module without any connections or joints extending outward from the housing of the battery module.

Figure 1:
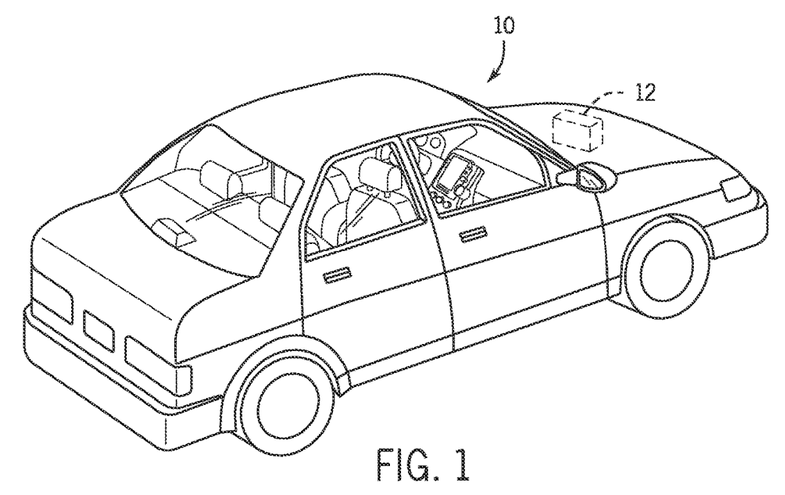
FIG. 1 is a perspective view of a vehicle having a battery system configured in accordance with present embodiments to provide power for various components of the vehicle.

With the foregoing in mind, FIG. 1 is a perspective view of an xEV 10 in the form of an automobile (e.g., a car) having a battery system 12 in accordance with present embodiments for providing a portion of the motive power for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 12 to power at least one or more accessories (e.g., AC, lights, consoles), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 12 is illustrated in FIG. 1 as being positioned in the trunk or rear of the vehicle, according to other embodiments, the location of the battery system 12 may differ. For example, the position of the battery system 12 may be selected based on the available space within a vehicle, the desired weight balance of the vehicle, the location of other components used with the battery system 12 (e.g., battery control units, measurement electronics), and a variety of other considerations.

Figure 2:
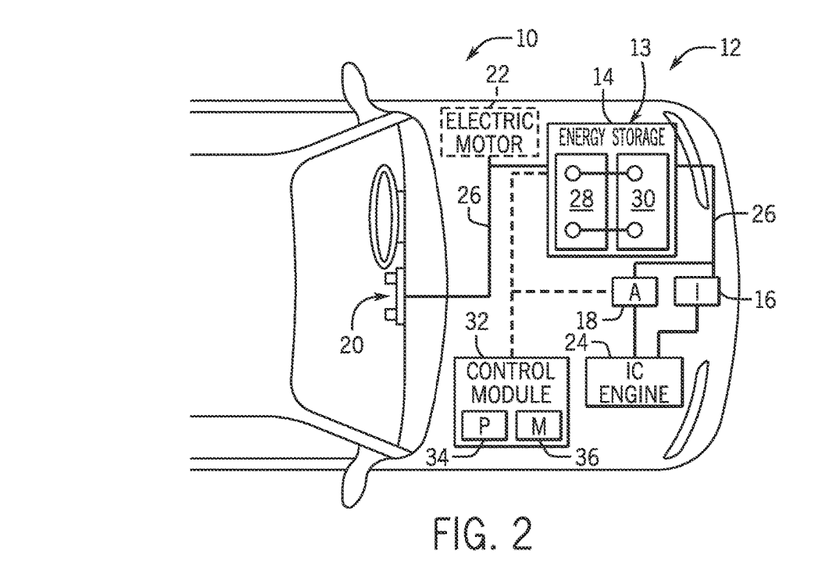
FIG. 2 is a cutaway schematic view of an embodiment of the vehicle and the battery module of FIG. 1.

The xEV 10 may be an HEV having the battery system 12, which includes one or more battery modules 13, as illustrated in FIG. 2, where each of the battery modules 13 includes one or more electrochemical cells. In particular, the battery system 12 illustrated in FIG. 2 is disposed toward the rear of the vehicle 10. In other embodiments, the battery system 12 may be provided in a separate compartment in the rear of the vehicle 10 (e.g., a trunk), or provided in another suitable location in the HEV 10. Further, as illustrated in FIG. 2, the HEV 10 includes an internal combustion engine 16 for times when the HEV 10 utilizes gasoline power to propel the vehicle 10. The HEV 10 also includes an electric motor 18, a power split device 20, and a generator 22 as part of the drive system.

The HEV 10 illustrated in FIG. 2 may be powered or driven by the battery system 12 alone, by the combustion engine 16 alone, or by both the battery system 12 and the combustion engine 16. It should be noted that, in other embodiments, other types of vehicles and configurations for the vehicle drive system may be utilized, and that the schematic illustration of FIG. 2 should not be considered to limit the scope of the subject matter described in the present application. According to various embodiments, the size, shape, and location of the battery system 12, the corresponding battery module(s) 13, and the type of vehicle, among other features, may differ from those shown or described.

As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10. In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. In the depicted embodiment, the energy storage component 14 supplies power to the vehicle console 20 and the ignition system 16, which may be used to start (e.g., crank) the internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules 13. For example, in the depicted embodiment, the energy storage component 14 includes a lithium ion (e.g., a first) battery module 28 and a lead-acid (e.g., a second) battery module 30, which each includes one or more battery cells. In other embodiments, the energy storage component 14 may include any number of battery modules 13. Additionally, although the lithium ion battery module 28 and lead-acid battery module 30 are depicted adjacent to one another, they may be positioned in different areas around the vehicle. For example, the lead-acid battery module 30 may be positioned in or about the interior of the vehicle 10 while the lithium ion battery module 28 may be positioned under the hood of the vehicle 10.

In some embodiments, the energy storage component 14 may include multiple battery modules 13 to utilize multiple different battery chemistries. For example, when the lithium ion battery module 28 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, control voltage output by the alternator 18 and/or the electric motor 22, and the like.

Figure 3:
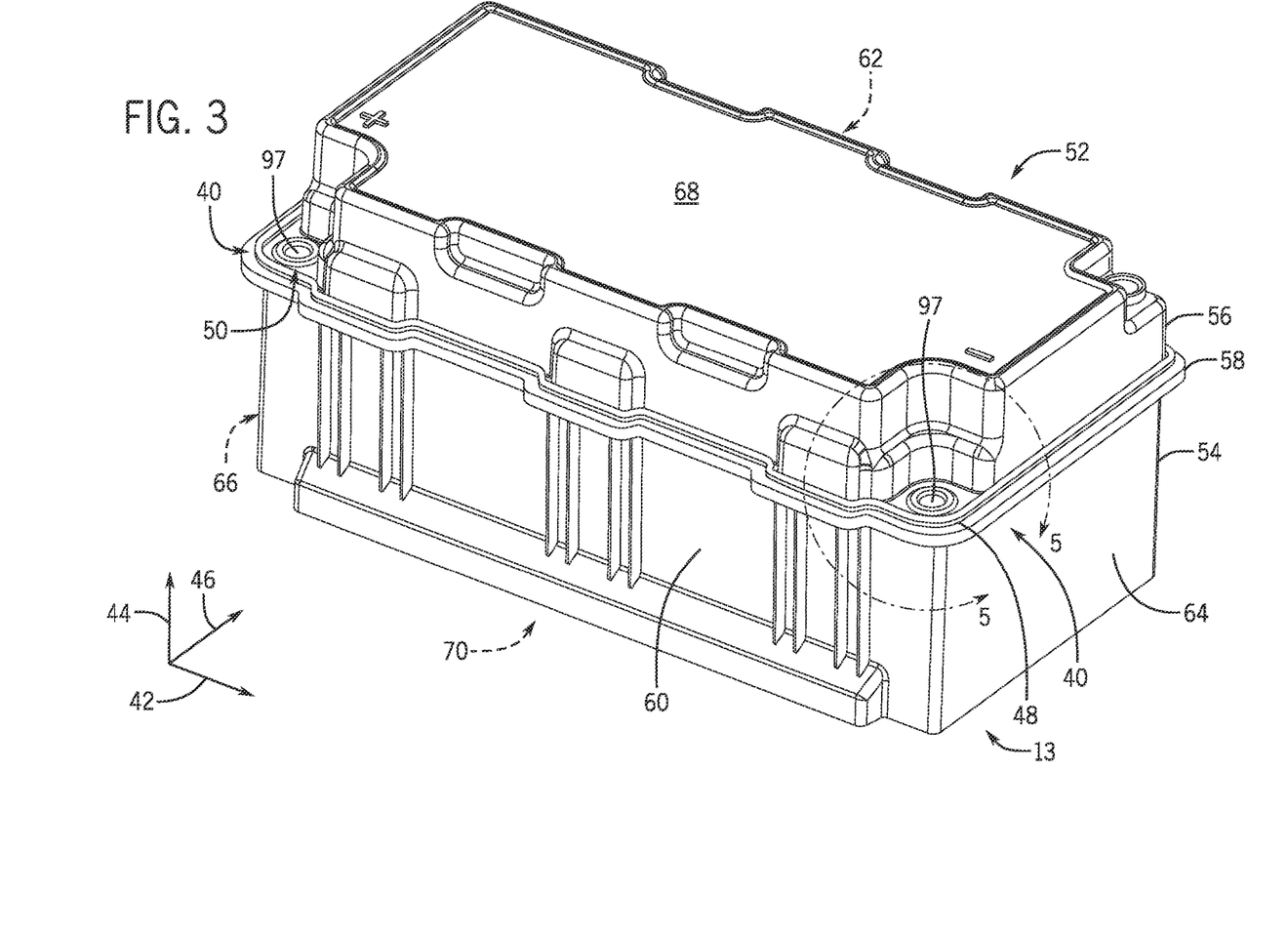
FIG. 3 is a perspective view of an embodiment of a battery module for use in the vehicle of FIG. 1, having a recess terminal in accordance with an aspect of the present disclosure.

Accordingly, the control unit 32 may include one or processor 34 and one or more memory 36. More specifically, the one or more processor 34 may include one or more application specific integrated circuits (ASICs), one or more field programmable gate arrays (FPGAs), one or more general purpose processors, or any combination thereof. Additionally, the one or more memory 36 may include volatile memory, such as random access memory (RAM), and/or non-volatile memory, such as read-only memory (ROM), optical drives, hard disc drives, or solid-state drives. In some embodiments, the control unit 32 may include portions of a vehicle control unit (VCU) and/or a separate battery control module. Furthermore, as depicted, the lithium ion battery module 28 and the lead-acid battery module 30 are connected in parallel across their terminals. In other words, the lithium ion battery module 28 and the lead-acid module 30 may be coupled in parallel to the vehicle's electrical system via the bus 26. It should be noted that the lithium ion battery modules 28 may have any one of a variety of different shapes, sizes, output voltages, capacities, and so forth, and the present disclosure is generally intended to apply to different variations of the shapes and sizes of the modules illustrated in the figures Indeed, one example battery module 13 is shown in a perspective view in FIG. 3. Specifically, FIG. 3 is a perspective view of an embodiment of the battery module 13 for use in the vehicle of FIG. 1. In the illustrated embodiment, the battery module 13 depicts one or more major terminals 40 in accordance with an aspect of the present disclosure. Specifically, the one or more major terminals 40 having one or more portions embedded within a recess. To facilitate discussion of the battery module 13 and the various assemblies and components thereof, a Z axis 42 is defined as extending through the length of battery module 13, a Y axis 44 is defined as extending through the height of the battery module 13 (transverse to the length in a first direction), and an X axis 46 is defined as extending through a width of the battery module 13 (transverse to the length and the height).

In certain embodiments, the battery module 13 includes a first terminal 48 (e.g., a negative terminal) and a second terminal 50 (e.g., a positive terminal) that may be coupled to an electrical load (e.g., circuit) for providing power to the xEV 10. In other embodiments, the battery module 13 may have more than two terminals, for example, to provide different voltages for different loads via connections across different terminal combinations. In particular, the first terminal 48 and the second terminal 50 may be recess terminals or stamped recess terminals that are integrated into a housing 52 of the battery module 13, as further described below. In other words, the recess terminals may be female recess terminals disposed within the housing such that they are configured to receive a male post within the recess of the housing.

Figure 4:
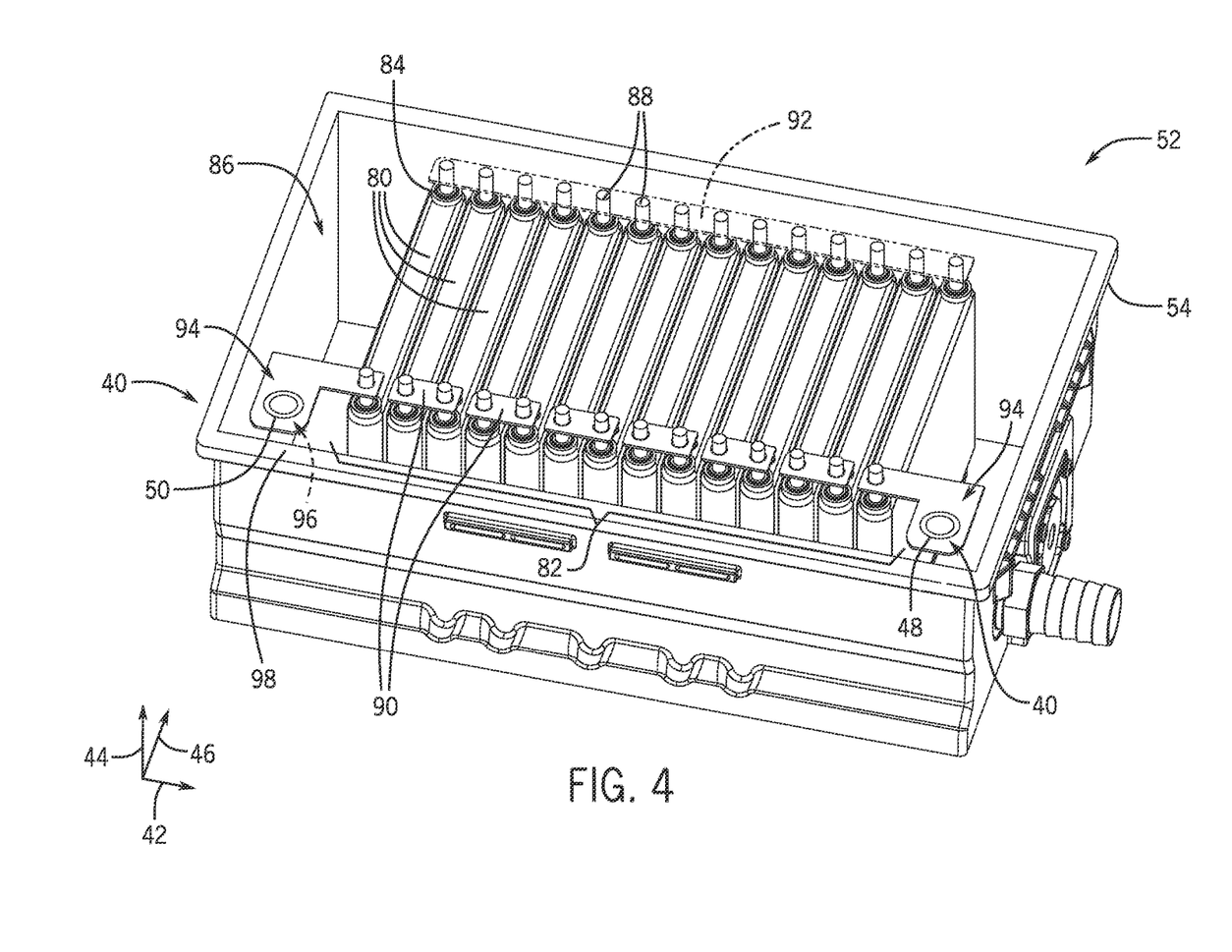
FIG. 4 is a top perspective view of a portion of the battery module of FIG. 3 with a housing cover removed, in accordance with an aspect of the present disclosure.

The battery module 13 includes the housing 52 for packaging or containing a plurality of battery cells (as shown in FIG. 4) and other components of the battery module 13. In particular, the housing 52 may include one or more portions, such as a lower housing portion 54 and a housing cover 56. In some situations, the lower housing portion 54 and the housing cover 56 may be coupled and secured with a housing collar 58. In certain embodiments, the housing collar 58 surrounds the perimeter of the housing 52 along the juncture of the lower housing portion 54 and the housing cover 56. As further described with respect to FIGS. 6-10, the major terminals 40 may be disposed within the housing 52 (e.g., within a recess of the housing 52), such that connections or joints of the major terminals 40 do not extend away from the housing or protrude from the housing 52. For example, in certain embodiments, the major terminal 40 may be disposed within the lower housing portion 54 and may be secured within the housing 52 with the housing cover 56 and the housing collar 58, as further described with respect to FIG. 6.

The housing 52 may package a plurality of prismatic battery cells. The housing 52 may include two end portions 60 and 62 (e.g., disposed along the Z axis 42), two side portions 64 and 66 (e.g., disposed along the X axis 46), a top portion 68 (e.g., fitted with the housing cover 56), and a bottom portion 70. The housing 52 may be metallic (e.g., made from steel, aluminum, or another suitable metal), may be polymeric (e.g., polypropylene, acrylonitrile butadiene styrene (ABS), a polystyrene (PS), a polyimide (PI), or another suitable polymer or plastic or combination thereof), or any other suitable housing material or combination of materials.

The dimensions (e.g., length and width) of the base (e.g., the bottom portion 70) of the battery module 13 may be selected to be similar to or exactly the same as that of a particular type of lead-acid battery (e.g., a particular battery group). The battery module 13 may include any number of battery cells, depending on the voltage and/or capacity requirements of the battery module 13, as well as the individual voltage and capacity of each battery cell and the manner in which they are coupled. Accordingly, any number and/or arrangement of battery cells may be used depending on the desired power of the battery module 13 and/or the desired dimensions (e.g., length, width, and/or height) of the battery module 13. It should be appreciated with reference to the illustrated embodiment that no actuating clamping features are used on the battery module 13. Rather, the battery cells remain in a compressed assembly by way of internal housing and compression features.

In this regard, the housing 52 of the battery module 13 may be configured such that a group of battery cells may be arranged within the housing 52 as a compressed assembly to provide a desired power output, regardless of the degree of variance in dimensions of individual battery cells, as long as each are within the manufacturing tolerance of the individual battery cells. As an example, at least one dimension of the housing 52 may be selected to allow placement of a desired number of battery cells even if all of the battery cells have dimensions on a larger side of a manufacturing tolerance range. Further, the at least one dimension of the housing 52 may be selected to place or maintain a desired compression force on the group of battery cells, even if all of the battery cells have dimensions on a smaller side of the manufacturing tolerance range. In this situation, the battery module 13 may include various internal features that ensure this force is provided.

FIG. 4 is a top perspective view illustrating the battery module 13 of FIG. 3 with the housing cover 56 and/or the housing collar 58 removed, in accordance with an aspect of the present disclosure. As noted above, the battery module 13 may be sized to facilitate the placement of a plurality of battery cells 80 in a desired manner (e.g., as a compressed assembly). While any single type of battery cell 80 may be utilized, the battery cells 80 used within the battery module 13 may all have the same general shape (e.g., prismatic, cylindrical, pouch, or any other), the same electrochemistry (e.g., electrode active materials, electrolytes, additives), the same general dimensions (e.g., to within manufacturing tolerances), and other similar design features (e.g., electrical isolation). In the depicted embodiment, the battery module 13 includes a number of battery cells 80 sufficient to enable the battery module 13 to provide a 48 V output, though the battery module 13 may output other voltages (e.g., 12 V) using different numbers and/or connections of battery cells 80. In the illustrated embodiment, the battery cells 80 described herein may be prismatic battery cells, where a prismatic battery cell, as defined herein, includes a prismatic case that is generally rectangular in shape. In contrast to pouch cells, the prismatic casing is formed from a relatively inflexible, hard (e.g., metallic) material. However, it should be noted that certain embodiments described below may incorporate pouch cells in addition to or in lieu of prismatic battery cells.

The battery cells 80, before introduction into the module housing 52, may be arranged in a cell stack 82. In certain embodiments, a spacer 84 (e.g., one or more) may be used between each battery cell 80 of the cell stack 82 to separate the battery cells 80 from one another. The spacers 84 may be in any suitable form, such as discrete layers (e.g., plastic or silicone dividers) that are separate from the battery cells 80; adhesive strips, tabs, or the like that are adhered to the battery cells 80; rubber bands wrapped around the individual battery cells 80; or adhesive foam tape secured to the battery cells 80. In embodiments where the spacers 84 are adhesive, the battery cells 80 may be adhered to one another. In the illustrated embodiment, the cell stack 82 is oriented along the z-axis 42 (e.g., in a row arrangement). However, it should be noted that the battery cells 80 may be positioned in any suitable arrangement. For example, while a single cell stack 82 may be utilized, in other embodiments, the battery cells 80 may be arranged in one or more cells stacks 82. Further, the one or more cell stacks 82 may be oriented vertically (e.g., in a columnar arrangement) or horizontally (e.g., in a row arrangement).

The cell stack 82 of battery cells 80 and spacers 84 (where utilized) may be inserted into an opening 86 of the housing 52. In certain embodiments, housing 52 may be sized to a maximum allowable tolerance for a desired number of battery cells 80 (e.g., to provide a desired power output for the battery module 13). That is, the housing 52 may be large enough to accommodate the desired number of battery cells 80 and other components (e.g., spacers 84).

As shown, the battery cells 80 may include one or more minor terminals 88 (e.g., cell terminals) configured to interface with one or more bus bars 90 to electrically couple adjacent battery cells 80 in order to form a group of electrically interconnected electrochemical cells 80. In certain embodiments, the bus bars 90 may be mounted or disposed on a bus bar carrier 92, which may retain the bus bars 90 disposed thereon while interfacing with the terminals 88 of the battery cells 80. However, in other embodiments, the battery module 13 may not include the bus bar carrier 92 and the bus bars 90 may be disposed directly onto the terminals 88. Depending on the embodiment, the bus bars 90 may couple the battery cells 80 in series, in parallel, or some of the battery cells 80 in series and some of the battery cells 80 in parallel. In general, the bus bars 90 enable a group of electrically interconnected battery cells 80. Further, certain of the bus bars 90 may be configured to enable electrical coupling of the group of electrically interconnected battery cells 80 with the major terminals 40 (e.g., the first terminal 48 or the second terminal 50) of the battery module 13, where the major terminals 40 are configured to be coupled to a load (e.g., component(s) of the vehicle 10) to power the load. It should be noted that the major terminals 40 may additionally be referred to as major terminals.

In accordance with present embodiments, the bus bars 90 may include two major bus bars 94 configured to enable electrical communication between the group of electrically interconnected battery cells 80 and the major terminals 40. For example, the two major bus bars 94 may extend beyond a perimeter of the bus bar carrier 92 and may each define at least a portion of a corresponding electrical path between the group of electrically interconnected battery cells 80 and the major terminals 40. The major bus bars 94 may include a first material (e.g., aluminum) corresponding with a material of the terminals 88 of the battery cells 80 and with the bus bars 90 (e.g., minor bus bars or cell bus bars). In accordance with present embodiments, each major bus bar 94 may extend from the group of electrically interconnected battery cells 80 toward another component of the corresponding electrical path extending between the group of electrically interconnected battery cells 80 and the corresponding major terminals 40.

In traditional configurations, the major bus bars 94 may be welded to portions of the major terminals 40. However, as noted above, such configurations may increase the cost of the battery module and complexity of manufacturing. In other traditional configurations, the major bus bars 94 may include portions that wrap around a base of a major terminal and an opening configured to receive a post of the corresponding major terminal, thereby enabling the major bus bars 94 to retain the major terminal without welding. However, such configurations may protrude or extend from the surfaces of the housing 52, and such extended connections may expose the battery module to potential short circuits and/or other complications. Accordingly, as noted above, to address these and other shortcomings of traditional battery module configurations, battery modules in accordance with the present disclosure include major terminals 40 that are disposed within a recess 96 (e.g., an opening, a pocket, etc.), as further described below. The recess 96 may be accessible through any surface of the housing 52 of the battery module, as further described below. In particular, the major terminals 40 may engage with the major bus bars 94 within the recess 96 of the housing 52, thereby reducing any extending or protruding connections, as further described below.

Figure 6:
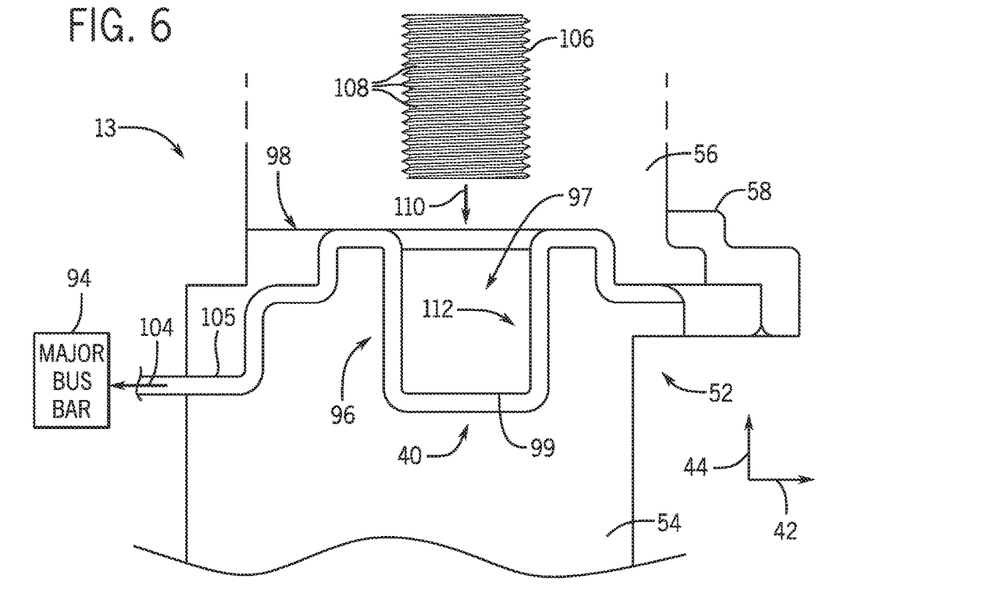
FIG. 6 is a cross-sectional side view of a portion of the battery module of FIG. 3, illustrating the recess terminal molded into the housing of the battery module, in accordance with an aspect of the present disclosure.
Figure 7:
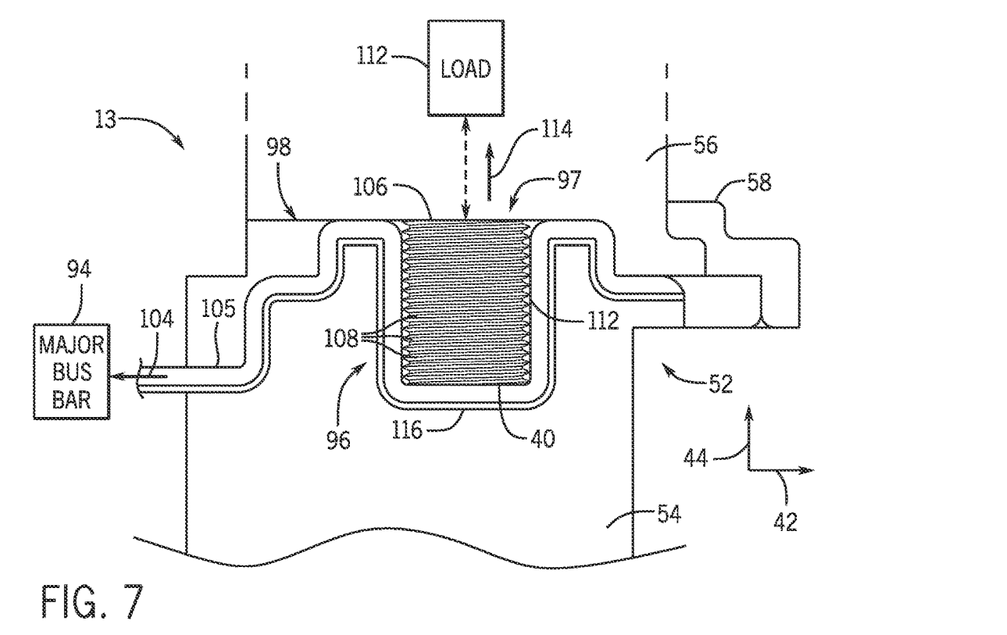
FIG. 7 is a cross-sectional side view of a portion of the battery module of FIG. 3, illustrating a sealant configured to secure the recess terminal molded within the recess of the housing, in accordance with an aspect of the present disclosure.

In certain embodiments of the present disclosure, the major terminal 40 may be molded into a recess 96 of the housing 52, as further described with respect to FIGS. 6 and 7. In some situations, the major terminal 40 may be referred to as a stamped major terminal, a stamped terminal, a recess terminal, a major recess terminal, a female terminal, and so forth. Specifically, in certain embodiments, portions of the major bus bars 94 may provide an electrical path to engage or couple with a base of the major terminal 40 that is molded into the recess 96 (e.g. opening, pocket, etc.). Further, a post of the major terminal 40 may engage with the base of the major terminal 40 within the recess 96. In certain embodiments, the recess 96 may be formed within the lower housing portion 54, and an opening 97 of the recess 96 may be disposed on a surface 98 of the lower housing portion 54, as further described with respect to FIGS. 6 and 7. Further, portions of the major terminal 40 that are molded into the recess 96 may form a continuous unit between the major terminal 40 and the major bus bars 94 extending from the bus bars 90. In certain embodiments, a post (e.g., threaded nut) corresponding to the base of the major terminal 40 may be inserted and removed through the opening 97 of the recess 96, such that the threads of the nut engage the major terminal 40, as further described with respect to FIGS. 6 and 7. Accordingly, the major terminal 40 may be a single continuous unit that is electrically coupled to the major bus bar 94 within the housing 52 and that allows electrical flow to the major bus bar 94 without external joints or connections.

In addition, in certain embodiments of the present disclosure, portions of the major bus bars 94 may be disposed on the surface 98 of the lower housing portion 54 above the recess 96. Specifically, the major bus bar 94 may include an opening that aligns with the opening of the recess 96. Further, the major bus bar 94 may be configured to engage one or more portions of a post of the major terminal 40. For example, the post of the major terminal 40 may be inserted into the recess 96 of the housing 52 to engage with the base of the major terminal 40. As noted above, the base of the major terminal 40 may be disposed within the recess 96, such that the major terminal 40 may be accessible through the surface of the housing. Indeed, one or more portions of the major bus bar 94 may engage with one or more portions of the post when the post of the major terminal 40 engages with the base, as further described with respect to FIGS. 8-10. In such embodiments, the base may be securely retained within the recess 96, rather than be molded into the recess 96. In addition, the threads of the nut may be configured to receive the major terminal 40 within the recess 96 of the housing, thereby electrically coupling the load to the battery module without any exposed joints or connections.

Figure 5:
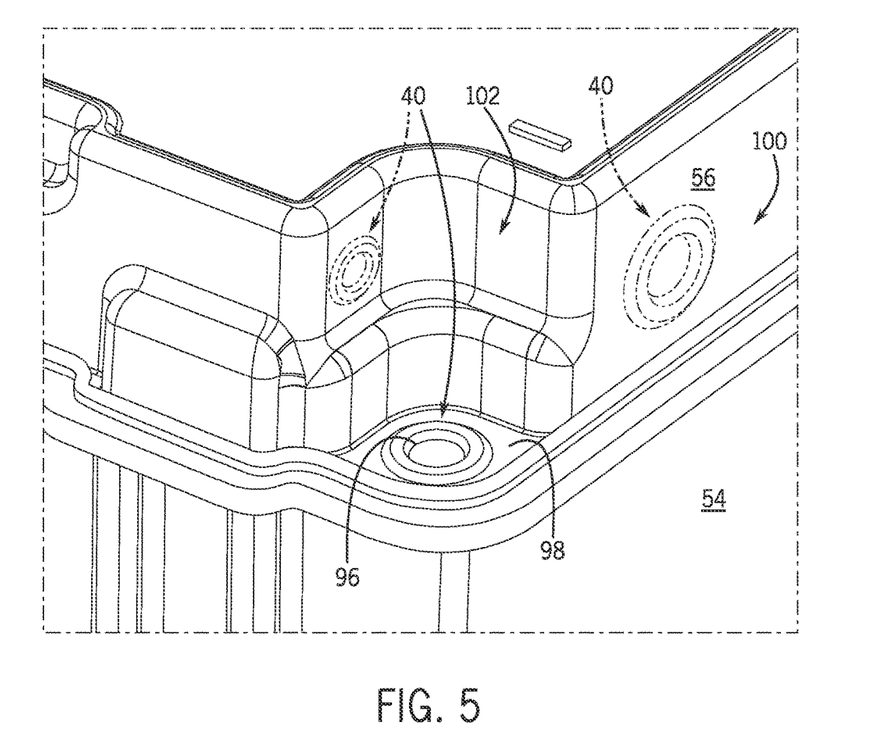
FIG. 5 is a perspective view of an embodiment of a portion of a battery module for use in the vehicle of FIG. 1, illustrating the recess terminal in one or more locations, in accordance with an aspect of the present disclosure.

FIG. 5 is a perspective view of an embodiment of a portion of a battery module 13 for use in the vehicle of FIG. 1, illustrating the major terminal 40 in one or more locations on the battery module 13, in accordance with an aspect of the present disclosure. As noted above, the major terminal 40 may be molded and/or disposed within a recess 96 of the housing 52. It should be noted that the recess 96 and the corresponding major terminal 40 may be disposed anywhere within the housing 52, such that the recess 96 and the corresponding major terminal 40 are accessible through any surface of the housing 52. For example, in the illustrated embodiment, the major terminal 40 may be disposed on the surface 98 on the lower housing portion 54, on a sidewall 100 on the housing cover 56, and/or on a curved wall 102 on the housing cover 56. Indeed, the major terminal 40 may be disposed on any surface of the housing 52, as long as the major bus bar 94 is able to maintain an electrical path between the bus bars 90 and the major terminals 40.

FIG. 6 is a cross-sectional side view of a portion of the battery module 13 of FIG. 3, illustrating one or more portions of the major terminal 40 molded into the housing 52 of the battery module 13, in accordance with an aspect of the present disclosure. Specifically, in the illustrated embodiment, a base 99 of the major terminal 40 may be molded into a recess 96 disposed within the housing 52. In some situations, the major terminal 40 may be referred to as a stamped major terminal, a stamped terminal, a recess terminal, a major recess terminal, a female terminal, and so forth. As noted above, the recess 96 may be disposed within the housing 52 such that the recess 96 is accessible through any surface of the housing 52. For example, in the illustrated embodiment, the recess 96 is disposed within the lower housing portion 54, and the opening 97 of the recess 96 may be accessible through a surface 98 of the lower housing portion 54. It should be noted that the recess 96 may be shaped to receive the base 99 of the major terminal 40. Particularly, the base 99 of the major terminal 40 may be molded or stamped into the recess 96 subsequent to forming the recess 96 within the housing 52.

In certain embodiments, an electrical path 104 may electrically couple the base 99 of the major terminal 40 that is molded into the recess 96 (e.g. opening, pocket, etc.) to portions of the major bus bars 94. It should be noted that the base 99 of the major terminal 40 may be molded into the recess 96 to form a continuous unit that allows electrical flow through the continuous component to the major bus bar 94 without any external connections or joints. In certain embodiments, a post 106 (e.g., threaded nut 106) corresponding to the base 99 of the major terminal 40 may be inserted and/or removed through the opening 97 of the recess 96. In particular, the post 106 may be inserted into the recess 96 via a first direction 110 along the Y axis 44. When inserted into the recess 96, one or more threads 108 of the post 106 may be configured to engage an inner surface 112 of the base 99 of the major terminal 40, as further described with respect to FIG. 7. In certain embodiments, the inner surface 112 of the major terminal 40 may include one or more threads or indentations that correspond to the threads 108 of the post 106. In certain embodiments, the major terminal 40 may include one or more extensions 105 that extend through the lower housing portion 54 to form the electrical path 104 to the major bus bar 94. Indeed, the one or more extensions 105 may be formed out of the same material as the base 99 of the major terminal 40, and may be any shape or length appropriate to establish the electrical path 104 to the major bus bar 94. In particular, in certain embodiments, the recess 96 may be any shape or length appropriate to support the contour of the desired major terminal 40.

It should be noted that base 99 of the major terminal 40 may be manufactured by stamping the base 99, heating and bending the base 99, deep drawing the base 99 (e.g., via a cold formed process), a combination thereof, or any other suitable manufacturing technique. In certain embodiments, the base 99 of the major terminal 40 may be molded into the recess 99 via injection molding, or other similar techniques. In this manner, the base 99 of the major terminal 40 may be molded into the major terminal 40 such that the base 99 takes the shape of the recess 96. Further, the base 99 may be embedded into the major terminal 40, thereby receiving the post of the major terminal 40 within the recess 96. In certain embodiments, a portion of the base 99 may form a raised collar or a ring on the surface of the housing 52, as a means of providing additional support for the post inserted and/or removed from the base 99.

In certain embodiments, the material of the base 99 of the major terminal 40 may be different than the material of the post 106. For example, the base 99 may be formed out of a first material (e.g., copper), and the post 106 may be formed out of a second material (e.g., aluminum). It should be noted that any type of material may be used to form the major terminal 40. For example, any type of material that is conducive to molding through an opening of the recess 96 may be utilized for the major terminal 40. Accordingly, the present techniques may be conducive to electrically engaging and/or coupling the base 99 with the post 106 without welding the material of the base 40 with the material of the post 106. Accordingly, the material cost of the battery module 13 and/or the complexity of manufacturing the battery module 13 may be reduced when utilizing a battery module having the major terminal 40.

FIG. 7 is a cross-sectional side view of a portion of the battery module 13 of FIG. 3, illustrating the base 99 of the major terminal 40 molded into the recess 96 of the battery module 13 and configured to receive the post 106, in accordance with an aspect of the present disclosure. Specifically, in the illustrated embodiment, the post 106 may be inserted into the recess 96 along the Y axis 44, such that the one or more threads 108 of the threaded nut 106 are configured to engage with the inner surface 112 of the base 99. In this manner, the major terminal 40 may be configured to electrically couple a load 114 to the battery module 13 without any connections or joints exposed outside of the housing 52. Likewise, when the post 106 is removed from the recess 96 along the Y axis 44 in a second direction 114, the one or more threads 108 of the post 106 may disengage with the major terminal 40 and decouple the load 114 from the battery module 13.

In certain embodiments, the base 99 of the major terminal 40 may be secured within the recess 96 with a form of attachment mechanism 116, such as sealants, glues, o-rings, resins, adhesives, foams, or any combination thereof. For example, during the assembly and/or manufacture of the major terminal 40, the base 99 may be inserted into the recess 96 formed within a portion of the housing 52. In the illustrated example, the recess 96 is disposed within the lower housing portion 54 of the housing 52. In certain embodiments, the material of the base 99 (e.g., copper) may be different from the material of the housing 52 (e.g., plastic). Accordingly, any type of appropriate attachment mechanism 116 may be utilized to secure the major terminal 40 within the housing 52. In certain embodiments, after the base 99 is inserted into the recess 96 formed within a portion of the housing 52, the base 99 of the major terminal 40 may be secured within the lower housing portion 52 when the housing cover 56 is disposed on top of the major terminal 40. In such embodiments, the attachment mechanism 116 may or may not be utilized to secure the major terminal 40 within the housing 52. In particular, the housing cover 56 may include one or more window-like apertures or openings in alignment with the opening 97 of the recess 96, such that the post 106 may be inserted into the base 99, as described above. Furthermore, in certain embodiments, the housing cover 56 and the alignment of the housing cover 56 with the lower housing portion 54 may be secured with a housing collar 58. As illustrated, the housing collar 58 may be configured as a snap and/or clip attachment that couples the housing cover 56 with the lower housing portion 54. In particular, the housing collar 58 may be configured to surround the perimeter of the housing 52 along the intersection where the lower housing portion 64 and the housing cover 52 meet. In this manner, the major terminal 40 may be sealed within the housing 52, thereby reducing the likelihood of leakage within the battery container or battery module container after the housing cover 56 is sealed.

Figure 8:
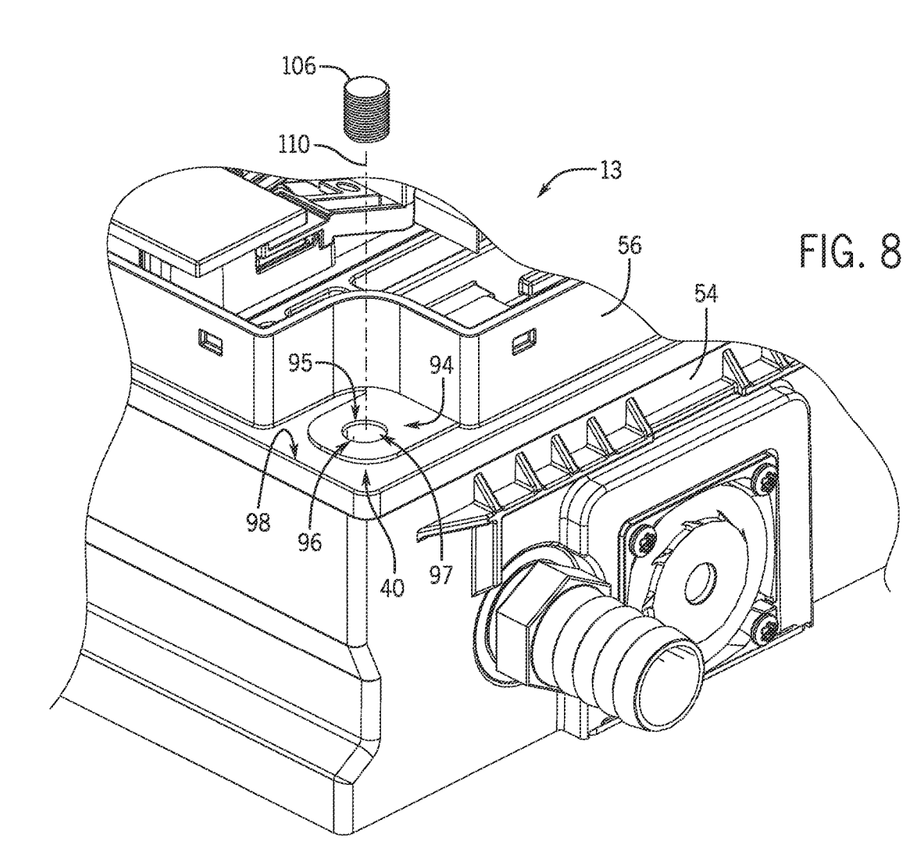
FIG. 8 is a perspective view of a portion of the battery module of FIG. 3, illustrating the major terminal accessible through a surface of a housing of the battery module, in accordance with an aspect of the present disclosure.

FIG. 8 is a perspective view of a portion of the battery module 13 of FIG. 3, illustrating the portions of the major terminal 40 disposed within the recess 96 of the lower housing portion 54 of the battery module 13, in accordance with an aspect of the present disclosure. Specifically, in the illustrated embodiment, the post 106 (e.g., threaded nut 106) associated or corresponding to the base 99 of the major terminal 40 may be inserted and/or removed through the opening of the recess 96. As noted above, the opening 97 of the recess 96 may be disposed on the surface 98 of the lower housing portion 54 of the battery module 13. Specifically, in certain embodiments, the opening 97 of the recess 96 may be aligned with an opening through a body 95 of the major bus bar 94 which extends from the bus bars 90 to the major terminal 40. The major bus bar 94 may be disposed along the surface 98 such that one or more portions of the body 95 of the major bus bar 94 surround the opening 97 of the recess 96. Accordingly, the post 106 associated with the base 99 of the major terminal 40 may be inserted and/or removed from the opening 97 of the recess 96 through the major bus bar 94. In particular, the major bus bar 94 may be configured to engage a top portion of the post 106 when the post 106 is securely inserted into the recess 96 through the opening 97.

As noted above, the major terminal 40 may be disposed within any recess 96, such that the major terminal 40 may be accessible through any surface of the housing 52. For example, the major terminal 40 may be arranged such that they are accessible through any surface of the housing 52, as long as the major bus bars 94 can maintain an electrical path between the bus bars 90 and the major terminals 40. In certain embodiments, the major bus bar 94 may be configured to secure the opening 97 of the recess 96, such that the threaded nut 106 disposed within the recess 96 does not disengage from the housing 52. In other embodiments, the housing cover 56 may be disposed over the major terminal 40 and/or the major bus bar 94 to secure the recess 96 in the manner described above. It should be noted that in either embodiment, the major terminal 40 and/or the major bus bar 94 may be sealed within the housing 52, thereby reducing the likelihood of leakage within the battery container or battery module container.

Figure 9:
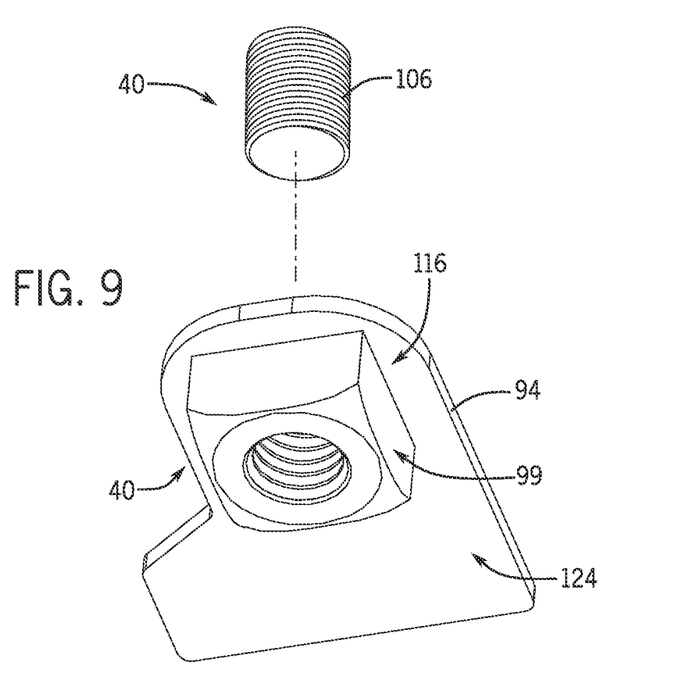
FIG. 9 is an exploded view of a portion of the battery module of FIG. 8, illustrating a post of the major terminal incorporated into the housing of the battery module, in accordance with an aspect of the present disclosure.

FIG. 9 is an exploded view of a portion of the battery module 13 of FIG. 8, illustrating one or more components of the major terminal 40 incorporated into the housing 52 of the battery module 13, in accordance with an aspect of the present disclosure. As noted above, in certain embodiments, the major terminal 40 may include the post 106 and the base 99. In particular, the post 106 is configured to engage with the base 99, such that a secure engagement or coupling is made between the components associated with the major terminal 40 and the major bus bar 94.

Specifically, as noted above, the base 99 may be disposed and secured within the recess 96. In certain embodiments, the base 99 may be secured within the recess 96 as it is sandwiched between the major bus bar 94 and one or more portions of the lower housing portion 54. It should be noted that in some situations, the base 99 may be secured to a bottom surface 124 of the major bus bar 94 with one or more attachment mechanisms 116, such as sealants, glues, o-rings, resins, adhesives, foams, or any combination thereof. In this manner, the base 99 may be secured within the recess 96, such that a portion of the major terminal 40 is not removed from the recess 96. In particular, in the illustrated embodiment, the base 99 need not be molded into the recess 96. Rather, the base 99 may be securely disposed within the recess 96 by being sandwiched between the major bus bar 94 and the housing 52.

Figure 10:
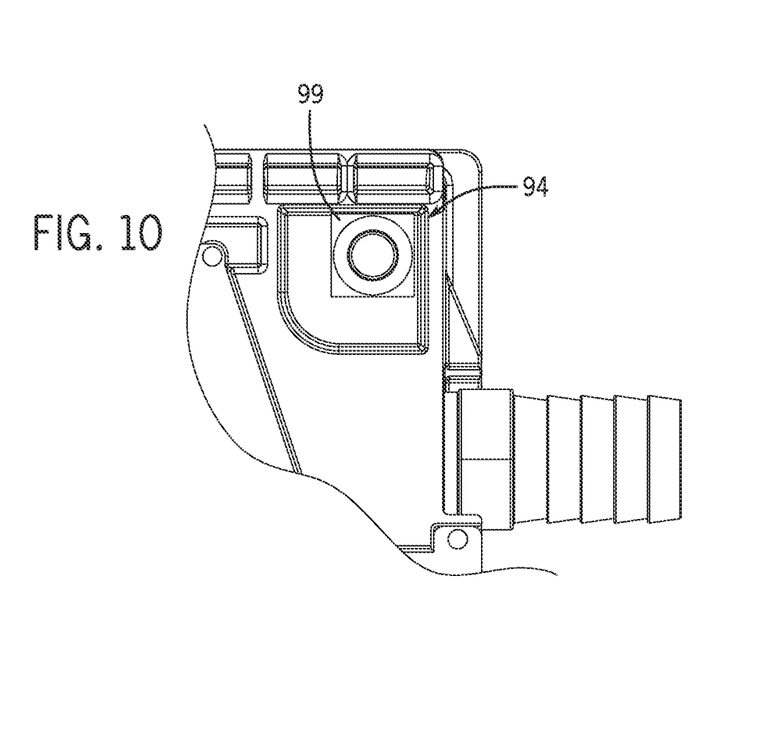
FIG. 10 is a bottom plan view of a portion of the battery module of FIG. 8, illustrating the post of the major terminal disposed underneath the major terminal, where the major terminal is accessible through the surface of the housing.

FIG. 10 is a bottom plan view of a portion of the battery module 13 of FIG. 8, illustrating the base 99 disposed underneath the major bus bar 94, in accordance with an aspect of the disclosure. Specifically, as noted above, the base 99 may be disposed and secured within the recess 96 such that the base 99 is sandwiched between the major bus bar 94 and one or more portions of the lower housing portion 54. In the illustrated embodiment, a portion of the lower housing portion 54 is removed to illustrate the configuration of the base 99 within the recess 96. Further, it should be noted that when the post 106 engages with the base 99, the major terminal 40 may be entirely disposed and secured within the recess 96 while maintaining an electrical connection and pathway to the major bus bar 94. In this manner, the battery module 13 may be electrically coupled to the load without any joints exposed or extending from the housing 52 of the battery module 13.

One or more of the disclosed embodiments, alone or in combination, may provide one or more technical effects useful in the manufacture of battery modules, and portions of battery modules. The disclosed embodiments relate to features of a battery module that may reduce a material cost of the battery module and complexity of manufacturing. Further, the disclosed embodiments relate to features of a battery module that are retained within a housing of the battery module, thereby reducing bulky and/or exposed connections. In particular, battery modules in accordance with the disclosed embodiments include major terminals disposed within a recess (e.g., an opening, a pocket, etc.) formed within a housing of the battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
 a polymer housing comprising:
  a lower housing portion having a first opening defined therein; and
  a housing cover disposed partially over the first opening in the lower housing portion, wherein the housing cover comprises a second opening defined therein having a raised collar extending circumferentially around the second opening;
 a bus bar disposed within the polymer housing and electrically coupled to a group of electrically interconnected battery cells disposed within the lower housing portion; and
 a major terminal comprising a base that is electrically coupled to the bus bar, wherein the base is secured within the first opening of the lower housing portion by the housing cover and is aligned with the second opening of the housing cover, wherein the base is configured to receive a post within the first opening to removably electrically couple the major terminal to an external load without exposed conductive components at an outer surface of the polymer housing.

2. The battery module of claim 1, wherein the base is molded into the first opening in the lower housing portion.

3. The battery module of claim 1, wherein the base is made of copper and the post is made of stainless steel.

4. The battery module of claim 1, wherein one or more portions of the major terminal are further secured within the first opening of the lower housing portion with an attachment mechanism, and wherein the attachment mechanism comprises a sealant, a glue, an o-ring, a resin, an adhesive, a foam, or a combination thereof.

5. The battery module of claim 1, wherein the bus bar comprises an aperture that aligns with the first opening in the lower housing portion.

6. The battery module of claim 1, wherein the group of electrically interconnected battery cells comprises a group of electrically interconnected prismatic lithium-ion (Li-ion) electrochemical cells.

7. A battery module, comprising:
a polymer housing comprising:
a lower housing portion having a first opening defined therein; and
a housing cover disposed partially over the first opening in the lower housing portion, wherein the housing cover comprises a second opening defined therein having a raised collar extending circumferentially around the second opening;
an electrochemical cell having a minor terminal disposed within the polymer housing;
a major terminal electrically coupled to the electrochemical cell, wherein the major terminal comprises:
a base secured within the first opening of the lower housing portion and aligned with the second opening in the housing cover; and
a post electrically coupled to a load and removably engaged directly with the base within the first opening to electrically couple the major terminal to the load, wherein the base consists essentially of a first conductive material and the post consists essentially of a second conductive material different than the first conductive material; and
a bus bar that provides an electrical path between the minor terminal of the electrochemical cell and the major terminal of the battery module.

8. The battery module of claim 7, wherein the bus bar is at least partially disposed within the first opening, and wherein the bus bar comprises an aperture that receives the post of the major terminal.

9. The battery module of claim 7, wherein the bus bar is disposed within the base within the first opening of the lower housing portion.

10. The battery module of claim 7, wherein the first conductive material is copper and the second conductive material is stainless steel.

11. The battery module of claim 1, wherein the base is copper and the post is aluminum.

12. The battery module of claim 8, wherein the bus bar is made of the second conductive material of the post.

13. The battery module of claim 8, wherein the base comprises a nut that is welded about the aperture of the bus bar.

14. The battery module of claim 1, wherein the base is configured to be coupled to the post without welding.

15. The battery module of claim 3, wherein the bus bar is made of aluminum.

16. The battery module of claim 5, wherein the base is physically coupled to the bus bar at the aperture, and wherein the post extends through the aperture of the bus bar when the base receives the post to electrically couple the major terminal to the external load.

17. A battery module, comprising:
a polymer housing comprising:
a lower housing portion having a first opening defined therein; and
a housing cover disposed partially over the first opening in the lower housing portion, wherein the housing cover comprises a second opening defined therein having a raised collar extending circumferentially around the second opening;
a major terminal comprising a base secured within the first opening of the lower housing portion by the housing cover and aligned with the second opening of the housing cover, wherein the base is configured to receive a post within the first opening to removably electrically couple the major terminal to an external load.

18. The battery module of claim 17, wherein the base is molded into the first opening in the lower housing portion.

19. The battery module of claim 17, wherein at least one portion of the major terminal is at least partially secured within the first opening of the lower housing portion with an attachment mechanism, and wherein the attachment mechanism comprises a sealant, a glue, an o-ring, a resin, an adhesive, a foam, or a combination thereof.

20. The battery module of claim 17, comprising a bus bar disposed within the polymer housing and electrically coupled to a group of electrically interconnected battery cells disposed within the lower housing portion, wherein the base of the major terminal is electrically coupled to the bus bar.

* * * * *

UNITED STATES PATENT AND TRADEMARK OFFICE
CERTIFICATE OF CORRECTION

PATENT NO. : 10,056,598 B2
APPLICATION NO. : 14/802846
DATED : August 21, 2018
INVENTOR(S) : Robert J. Mack et al.

Page 1 of 1

It is certified that error appears in the above-identified patent and that said Letters Patent is hereby corrected as shown below:

In the Specification

In Column 1, Line 40, delete "full hybrid systems" and insert -- full hybrid electric vehicles --, therefor.

In Column 1, Line 43, delete "mild hybrid systems" and insert -- mild hybrid electric vehicles --, therefor.

In Column 3, Line 36, delete "DRAWINGS" and insert -- BRIEF DESCRIPTION OF DRAWINGS --, therefor.

In Column 6, Lines 53-54, delete "electric motor 18," and insert -- alternator 18, --, therefor.

In Column 8, Line 40, delete "figures" and insert -- figures. --, therefor.

In Column 14, Line 5, delete "base 40" and insert -- base 99 --, therefor.

In Column 14, Lines 59-60, delete "housing cover 52" and insert -- housing cover 56 --, therefor.

Signed and Sealed this
Eleventh Day of December, 2018

Andrei Iancu
*Director of the United States Patent and Trademark Office*